United States Patent Office

3,472,809
Patented Oct. 14, 1969

3,472,809
CURABLE COMPOSITION FOR FLEXIBLE MOLDS
Kenneth V. Hardman, Upper Montclair, N.J., assignor to Hardman Incorporated, a corporation of New Jersey
No Drawing. Filed Mar. 11, 1966, Ser. No. 533,419
Int. Cl. C08d *13/28;* C08c *11/44*
U.S. Cl. 260—31.8                                  9 Claims

ABSTRACT OF THE DISCLOSURE

The invention is directed to a flowable composition which when cured has a relatively high tensile strength. The composition is made from a high viscosity depolymerized rubber in which large amounts of liquid extender and filler are added. The composition has particular usefulness as a mold material because of its physical characteristics of being flowable and when cured provides a tough flexible mold.

---

This invention relates to a curable composition for making flexible molds and to a method of making such molds. More particularly, the invention relates to curable compositions containing as the base essential ingredient high viscosity depolymerized cis-1,4 polyisoprene rubber which is flowable at room temperature, such compositions providing new and important advantages in the making of flexible molds.

In conventional practice flexible molds are used for various purposes, for example, pattern making and tooling. The flexible mold is formed upon the article to be copied by pouring and curing flowable curable mold composition in a form box built around a so-called "master" of the article, and thereafter the cured rubber-like mold is separated from the master and used to cast duplicates of the article in various materials such as waxes, thermoplastic resins, gypsums, ceramics, thermosetting resins including epoxys, core sand formulations and elastomeric materials. Since many articles to be reproduced by the flexible mold process have poor or no tolerance to temperatures above room temperature, it is important that the curable composition be capable of curing at room temperature in the form box to avoid damage to the article which would be otherwise encountered at higher temperatures.

Conventional room temperature curable materials which are used to make flexible molds comprise generally polysulphide resins and silicone resins. The polysulfide resins suffer from the drawbacks of high expense and unpleasant odor and the fact that some sort of mold slip agent must often by used in order to release the article from the flexible mold. The silicone resins do not suffer from the mold release problem, but on the other hand, they are very expensive materials and have poor water penetration resistance.

In accordance with the present invention, a new curable composition has been discovered for making flexible molds based on the use of a relatively high viscosity depolymerized cis-1,4-polyisoprene rubber. This composition overcomes the drawbacks mentioned above of conventional material and, in particular, provides important advantages arising from the fact that the composition is inexpensive; it has superior penetration and surface wetting capabilities and thus provides very fine detail of reproduction when used to make a flexible mold; and further it has excellent dimensional stability and a pleasant odor. Furthermore, when the composition is formulated in two parts A and B and the parts are kept separated, each part has virtually indefinite shelf life and the mixing ratio of the two parts is not critical. Thus, the new composition can be stored for long periods and can be used for untrained or unskilled persons to make flexible molds which capture very fine details of reproduction from the article that is to be copied or cast. Finally, when parts A and B of the material of the invention are mixed, a rapid room temperature cure is achieved either in air or in sealed environments with negligible shrinkage during cure, which avoids distortion and loss of detail and results in very accurate reproduction.

As mentioned above, the curable composition of the invention utilizes a relatively high viscosity depolymerized polyisoprene rubber as the base ingredient. The depolymerized polyisoprene rubber, flowable at room temperature, may be either of synthetic or natural origin and either type may be used in the compositions of the invention. The natural material is depolymerized natural crude rubber whereas the synthetic material is a flowable cis-1,4 polyisoprene polymer. In making a room temperature flowable polyisoprene rubber, two basic conventional mechanisms can be used which are either to depolymerize natural or synthetic high molecular weight polyisoprene rubber or to polymerize isoprene monomer to achieve a flowable consistency which must fall within certain critical viscosity limits. Thus, in the present invention, it has been found critical and essential that the viscosity of the depolymerized polyisoprene rubber be from about 900,000 up to 3,000,000 c.p.s. at 68° F. as measured on a Brookfield viscometer, the term "depolymerized polyisoprene rubber" being defined herein to means cis-1,4 polyisoprene rubber having a viscosity within the specified range regardless of which of the two described basic mechanisms is employed to make such rubber.

The reason for this requirement of use of a high viscosity depolymerized polyisoprene rubber is not clearly undertood at this time. Generally speaking, as the viscosity of the uncured rubber increases, the strength of the cured material also increases. However, the unfilled depolymerized polyisoprene rubber alone does not have sufficient strength to be used as a flexible mold material. Quite surprisingly, it has been found that when high viscosity depolymerized rubber as defined above is blended with relatively high proportions of a liquid oil extender to a lower viscosity, the blend permits loading of high proportions of a solid filler and this in turn apparently strengthens the rubber to a substantially greater extent than the weakening effect of the extender whereby tough, flexible molds are readily achieved when the composition is cured. Thus, the large amount of filler apparently can more than make up for the loss in strength which is unavoidably caused by the very high proportion of the liquid extender since the strength of the final cured composition is in fact increased beyond that of the original depolymerized rubber that is employed. Such an effect is quite unusual and, though not capable of complete explanation at this time, it has been definitely established that the invention requires use of depolymerized polyisoprene rubber having a viscosity of about 900,000 to about 3,000,000 cps. at 68° F., with added defined amounts of liquid oil extender and a solid particulate filler, all of which are critical and essential ingredients.

The liquid extender may be any oily liquid which is substantially inert to the ingredients of the curable composition and which can be homogeneously blended with the depolymerized polyisoprene rubber. Ordinary petroleum mineral oil has been used with satisfactory results and, in particular, a mineral oil sold by the Humble Oil & Refining Company under the trademark Univolt has been found to give superior results. This Univolt oil has a specific gravity of 0.887, a flash point and fire point by Cleveland Open Cup test of 310° F. and 335° F. respectively, a pour point of −75° F. and a viscosity of 58 in SSU at 100° F. Other specific oils which may be used with good results include d-limonene which is obtained by steam distillation from orange and grapefruit peels. This oil in addition has the advantage of having a pleasant odor. Another useful oil is Amscosolv E–98 which is a mineral oil having a boiling point of 398° F. and a flash point by Cleveland Open Cup test of 176° F. Both of these oils have somewhat low boiling points and low viscosities and therefore generally will give greater weight loss at elevated temperatures. The Univolt 35 oil described above has a relatively high boiling point of 560° F. and thus is not as prone to weight loss when used at elevated temperatures. Another useful high boiling oil with a boiling temperature above 500° F. is sold under the trade name Adipol ED–2 which has a boiling point of 680° F. and a flash point by Cleveland Open Cup test of 398° F. The Adipol ED–2 oil is essentially di-2-ethylhexyl adipate and can be used to advantage where the curable composition or the flexible mold made therefrom is to be used at elevated temperatures. Other oily petroleum fractions, pine tar fractions, coal tar fractions and esters, having properties like those of the specific oils mentioned above, can be used as the liquid oil extender.

As for the filler, which is also essential in the compositions of the invention, this may in general be any inert solid particulate material having a small particle size which can be dispersed into the blend of depolymerized polyisoprene rubber and liquid oil extender. Specific fillers which can be used are titanium dioxide, calcium carbonate, precipitated barium sulfate, silica and carbon blacks. These fillers as previously noted have a unique strengthening effect upon the curable composition so that a tough flexible mold can be made having all of the described advantages which the invention provides over conventional materials. In this connection, the titanium dioxide filler has given outstanding superior results and is especially recommended where such optimum results are more important than cost considerations which in other cases may make the relatively high expense of using titanium dioxide less desirable.

In addition to the liquid oil extender and the filler, the curing agents for the depolymerized polyisoprene rubber must also be included. Since room temperature cure is an important requirement for the curable compositions, paraquinone dioxime and lead dioxide must be used as the curing agents. These curing agents provide a relatively rapid room temperature cure for the depolymerized polyisoprene rubber, the total time of cure generally being from about ½ to 1½ hours. Of course, where the article being reproduced can withstand higher temperatures, heat can be applied to increase the rate of cure.

As regards proportions, taking 100 parts of the depolymerized polyisoprene rubber as the reference point, from about 80 to about 250 parts of liquid oil extender are mixed with the depolymerized polyisoprene rubber and from about 100 to about 600 parts of solid particulate filler are required by weight. The paraquinone dioxime curing agent is generally included in proportions of about 1 to about 5 parts per 100 parts of the depolymerized polyisoprene rubber and the lead dioxide may be used in the proportions of about 10 to about 30 parts per 100 parts of the depolymerized polyisoprene rubber by weight.

In forming the curable composition of the invention, any suitable mixing equipment for high viscosity materials may be used. Generally speaking, it is recommended that the depolymerized polyisoprene rubber and some or all of the liquid oil extender be mixed together first and then the dry solid filler and curing agents added to the liquid blend. Pre-sifting of the dry solid materials reduces any tendency towards agglomeration when the solids are added to the blend of liquid oil extender and depolymerized polyisoprene rubber. Furthermore, kneading at a high viscosity also reduces tendencies toward agglomerations or lumps by the internal friction and rubbing action that is applied to the composition. After mixing of the ingredients has been achieved, the composition may be passed through a paint mill or colloid mill in order to increase the degree of dispersion and minimize any tendency for settlement of the solid ingredients.

If the curable composition is to be used immediately or shortly after mixing, the material may be prepared as a single completely mixed composition. On the other hand, if a storage capabiltiy is necessary or desired, then the composition of the invention may be prepared in two parts A and B. Part A preferably will contain the high viscosity depolymerized rubber, the paraquinone dioxime curing agent, the liquid oil extender and the filler. Part B will contain the lead dioxide curing agent, preferably dispersed in a liquid vehicle. When so prepared, parts A and B may be stored virtually indefinitely and then mixed together at any desired time to form the curable composition of the invention for preparation of flexible molds. In preparing part B, which comprises the lead dioxide curing agent in a liquid vehicle, it is preferred that dibutyl phthalate be used to disperse the lead dioxide powder since the phthalate ester also serves as a further extender for the depolymerized polyisoprene rubber when part B is mixed with part A.

It is necessary that the curable composition of the invention have a final viscosity within the range from about 15,000 to about 50,000 cps. at 75° F. as measured on the Brookfield viscometer rotating at 6 r.p.m. This is true of both the single completely-mixed composition as well as the two part A and B type composition, which means that the viscosity of each of the two parts of the latter type of composition will also be within the stated range. Such viscosities have been found to provide a curable composition which can be poured into form boxes of many different shapes and geometry, and the composition will readily cure to form a tough flexible at room temperatures in anywhere from about ½ hour to 1½ hours, depending on the proportions of curing agents that are employed. The greater the proportions of curing agents the faster will be the cure. However, one of the distinct advantages of the composition of the invention is that it is not sensitive to so-called overcure. In other words, the beneficial properties of the curable composition are achieved with great leeway in the relative proportions of curing agents that are present in relation to the amount of depolymerized polyisoprene rubber and this lack of criticality in the relative proportions of the curing agents makes the composition adaptable and easy to use in the hands of unskilled or untrained persons.

Further details of the invention are illustrated in the following examples which represent preferred embodiments thereof. All proportions given in terms of percentages or parts in the examples, as well as in the remainder of the specification and claims, are by weight unless otherwise indicated.

EXAMPLE 1

A two-part curable composition for preparation of flexible molds was made utilizing a high viscosity depolymerized polyisoprene rubber having a viscosity of about 1,500,000 cps. at 68° F. 100 parts of the flowable rubber were blended with 100 parts of Univolt 35 oil which has been previously described above. To this blend was then added 150 parts of titanium dioxide and 3 parts of paraquinone dioxime. Then part B of the composition was compounded by blending 20 parts of lead dioxide and 7 parts of dibutyl phthalate.

A mixture of 353 parts of part A and 27 parts of part B was made. After several hours at 74° F. a tough flexible rubber was achieved by curing of the depolymerized polyisoprene rubber ingredient in the composition and this material was highly suitable as a flexible mold.

EXAMPLE 2

Another two-part curable mold composition was prepared with the following formulations for parts A and B.

Part A

| | Parts |
|---|---|
| High viscosity depolymerized polyisoprene rubber (about 2,000,000 cps. at 68° F.) | 100 |
| Paraquinone dioxime | 3 |
| Calcium carbonate | 500 |
| Mineral oil | 150 |
| Total | 753 |

Part B

| | |
|---|---|
| Lead dioxide | 20 |
| Dibutyl phthalate | 7 |
| Total | 27 |

The materials of each of the parts A and B were thoroughly blended and dispersed together and then 753 parts of part A were mixed with 27 parts of part B. In a short time the mixture cured into a tough flexible rubber-like material which was highly suitable as a flexible mold.

It will be understood that various accelerators such as triethanolamine can be added to part B to increase the rate of cure.

EXAMPLE 3

A two-part curable mold composition having diethanolamine accelerator was prepared according to the following formulations for parts A and B.

Part A

| | Parts |
|---|---|
| High viscosity depolymerized polyisoprene rubber (about 2,500,000 cps. at 68° F.) | 100 |
| Paraquinone dioxime | 3 |
| Diatomaceous earth | 500 |
| Univolt 35 oil | 200 |
| Diethanolamine | 0.5 |
| Total | 803.5 |

Part B

| | |
|---|---|
| Lead dioxide | 10 |
| Dibutyl phthalate | 20 |
| Total | 30 |

The ingredients of each of the parts A and B were thoroughly blended and dispersed together. 100 parts of part A were then mixed with 3.75 parts of part B and, after 2 hours at 74° F., the mixture cured into a tough flexible rubbery solid which was an excellent flexible mold material. It will be noted that in this example the lead dioxide concentration in the mixed curable composition was 10% based on the weight of the depolymerized rubber. Yet this composition cured about as fast as that of Example 1, where the lead dioxide concentration was doubled to 20%, due to the accelerating action of the diethanolamine.

It will be further understood that it is intended to cover all changes and modifications of the preferred embodiments of the invention herein chosen for the purpose of illustration which do not constitute departures from the spirit and scope of the invention.

What is claimed is:

1. A curable composition particularly adapted for making flexible molds which comprises an admixture of cis-1,4 polyisoprene rubber which has been depolymerized to a Brookfield viscosity of about 900,000 to about 3,000,000 cps. at 68° F., from about 80 to about 250 parts of a liquid oil extender, from about 100 to about 600 parts of a solid particulate filler, from about 1 to about 5 parts of paraquinone dioxime, and from about 10 to about 30 parts of lead dioxide, all of the foregoing proportions being expressed by weight in relation to 100 parts by weight of said depolymerized cis-1,4 polyisoprene rubber and said admixture having a Brookfield viscosity of about 15,000 to about 50,000 cps. at 75° F. immediately after making said admixture.

2. A composition as in claim 1 separated into two parts, the first part comprising an admixture of said depolymerized cis-1,4 polyisoprene rubber, liquid oil extender, solid particulate filler, and paraquinone dioxime, and the second part comprising said lead dioxide, said lead dioxide of the second part being dispersed in a liquid vehicle.

3. A composition as in claim 2 wherein said liquid vehicle is dibutyl phthalate.

4. A composition as in claim 1 wherein said liquid oil extender is a petroleum mineral oil having a boiling point above 500° F.

5. A composition as in claim 1 wherein said solid particulate filler is titanium dioxide.

6. A method of forming a flexible mold which comprises pouring into place adjacent an article desired to be reproduced by means of the flexible mold an admixture, having a Brookfield viscosity, immediately after making said admixture, of about 15,000 to about 50,000 cps. at 75° F., of cis-1,4 polyisoprene rubber which has been depolymerized to a Brookfield viscosity of about 900,000 to about 3,000,000 cps. at 68° F., from about 80 to about 250 parts of a liquid oil extender, from about 100 to about 600 parts of a solid particulate filler, from about 1 to about 5 parts of paraquinone dioxime, and from about 10 to about 30 parts of lead dioxide, all of the foregoing proportions being expressed by weight in relation to 100 parts by weight of said depolymerized cis-1,4 polyisoprene rubber, and then curing said poured admixture into a rubber-like solid form to reproduce therein the adjacent shape of said article.

7. A method as in claim 6 carried out at ordinary room temperature.

8. A method as in claim 6 which includes the step of heating said poured admixture to accelerate the curing thereof.

9. A flexible mold made in accordance with the method set forth in claim 6.

References Cited

UNITED STATES PATENTS

| 2,993,023 | 7/1961 | Pfau et al. | |
| 3,160,595 | 12/1964 | Hardman et al. | 260—2.3 |
| 3,224,998 | 12/1965 | Kirkconnell | 260—41.5 |

OTHER REFERENCES

Dow Corning catalog, "Greater Versatility in Design and Production with Silastic RTV (1961), p. 1.

MORRIS LIEBMAN, Primary Examiner

H. H. FLETCHER, Assistant Examiner

U.S. Cl. X.R.

106—38.2; 260—33.6, 41.5; 264—225